United States Patent
Zhang et al.

(10) Patent No.: US 12,009,874 B2
(45) Date of Patent: Jun. 11, 2024

(54) HANDLING OF IMPAIRED ANTENNA BRANCH

(71) Applicant: Telefonaktiebolaget LM Ericsson (publ), Stockholm (SE)

(72) Inventors: Hao Zhang, Guangzhou (CN); Chonghao Yang, Guangzhou (CN); Mingshi Li, Guangzhou (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 260 days.

(21) Appl. No.: 17/415,149

(22) PCT Filed: Dec. 18, 2018

(86) PCT No.: PCT/CN2018/121657
§ 371 (c)(1),
(2) Date: Jun. 17, 2021

(87) PCT Pub. No.: WO2020/124343
PCT Pub. Date: Jun. 25, 2020

(65) Prior Publication Data
US 2022/0060264 A1 Feb. 24, 2022

(51) Int. Cl.
*H04B 17/17* (2015.01)
*H04B 17/12* (2015.01)
*H04B 17/309* (2015.01)

(52) U.S. Cl.
CPC ............ *H04B 17/17* (2015.01); *H04B 17/12* (2015.01); *H04B 17/309* (2015.01)

(58) Field of Classification Search
CPC ....... H04B 17/17; H04B 17/12; H04B 17/309
See application file for complete search history.

(56) References Cited

U.S. PATENT DOCUMENTS

2013/0257654 A1* 10/2013 Hu ................. H04B 17/17
342/372
2014/0204983 A1 7/2014 Bebawy et al.
(Continued)

FOREIGN PATENT DOCUMENTS

CN 101291164 A 10/2008
CN 101960727 A 1/2011
(Continued)

OTHER PUBLICATIONS

Chinese Office Action and English Summary dated Dec. 22, 2022 for Application No. 201880100345, consisting of 11 pages.
(Continued)

*Primary Examiner* — Edan Orgad
*Assistant Examiner* — Malick A Sohrab
(74) *Attorney, Agent, or Firm* — Weisberg I.P. Law, P.A

(57) ABSTRACT

There is provided mechanisms for handling an impaired antenna branch at a radio transceiver device. The radio transceiver device includes a plurality of antenna branches. Channel information is correlated among the respective antenna branches according to a correlation relation. A method is performed by a network node. The method includes obtaining an indication that at least one of the antenna branches at the radio transceiver device is impaired. The method includes, in response thereto obtaining channel information for each of the non-impaired antenna branches at the radio transceiver device. The method includes estimating channel information for each of the at least one impaired antenna branch using the obtained channel information and the correlation relation.

13 Claims, 9 Drawing Sheets

(56) References Cited

U.S. PATENT DOCUMENTS

| | | | |
|---|---|---|---|
| 2015/0222336 A1 | | 8/2015 | Yilmaz et al. |
| 2016/0308589 A1 | * | 10/2016 | Jalloul ............... H04L 25/0228 |
| 2018/0241484 A1 | | 8/2018 | Larsson et al. |
| 2019/0149249 A1 | * | 5/2019 | Raghavan .............. H04B 7/061 455/424 |

FOREIGN PATENT DOCUMENTS

| | | | | |
|---|---|---|---|---|
| CN | 102571182 A | | 7/2012 | |
| CN | 103283197 A1 | | 9/2013 | |
| CN | 106301508 A | | 1/2017 | |
| CN | 108289000 A | | 7/2018 | |
| CN | 108717496 A | * | 10/2018 | ............. G01R 29/10 |
| CN | 108717496 A | | 10/2018 | |
| JP | 2013046399 A | * | 3/2013 | |
| JP | 2014220637 A | | 11/2014 | |
| JP | 5761798 B2 | * | 8/2015 | |
| JP | 5761798 B2 | | 8/2015 | |
| WO | 2018166606 A1 | | 9/2018 | |

OTHER PUBLICATIONS

International Search Report and Written opinion dated Sep. 18, 2019 for International Application No. PCT/CN2018/121657 filed Dec. 18, 2018, consisting of 10-pages.
Linglong Dai et al.; Joint Channel Estimation and Feedback with Low Overhead for FDD Massive MIMO Systems; IEEE/CIC ICCC 2015 Symposium on Signal Processing for Communications, consisting of 6-pages.
EPO Communication and Search Report dated Nov. 18, 2021 for Patent Application No. 18943822.9, consisting of 8-pages.

* cited by examiner

HANDLING OF IMPAIRED ANTENNA BRANCH

CROSS-REFERENCE TO RELATED APPLICATIONS

This application is a Submission Under 35 U.S.C. § 371 for U.S. National Stage Patent Application of International Application Number: PCT/CN2018/121657, filed Dec. 18, 2018 entitled "HANDLING OF IMPAIRED ANTENNA BRANCH," the entirety of which is incorporated herein by reference.

TECHNICAL FIELD

Embodiments presented herein relate to a method, a network node, a computer program, and a computer program product for handling an impaired antenna branch at a radio transceiver device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to detect and handle faulty equipment. Compared to a traditional radio unit (RU) deployment with few antenna branches, this issue becomes more difficult to handle for Advanced Antenna Systems (AAS), massive multiple input multiple output (MIMO) systems or full dimension (FD) MIMO systems, all having large antenna arrays.

In this respect, AAS, massive MIMO systems or FD MIMO systems might be used to enhance network performance in multiple areas, e.g. cell coverage, throughput, spectrum usage etc. It is expected that hundreds of antennas would be needed for wireless networks operating in high frequency bands or even in the millimeter-wave spectrum.

FD-MIMO is using narrow beamforming to focus the radiated energy towards desired user equipment (UE), thereby achieving user-specific beamforming. In the multiuser MIMO case, signals in multiple beams are transmitted towards multiple desired UEs to increase the throughput or data rate.

To have a good performance in narrow beamforming, generally requires a large number of antennas, such as 32 to 64 antenna branches, as well as accurate channel information for each antenna branch.

In particularly, in a time division duplex (TDD) system, the downlink channel (i.e., from base station to served UE) and uplink channel (i.e., from UE to serving base station) might in some cases be assumed to have reciprocity such that the uplink channel information can be used when designing the downlink beamforming at the base station. In order for the base station to obtain the uplink channel information, the served UE might send uplink reference signals to the bases station which thus measures on the uplink reference signals in order to estimates the uplink channel.

However, the channel information might be inaccurate in some cases. One of the causes for inaccurate channel information is antenna calibration failure. Another cause is a broken or faulty uplink antenna branch in the base station. Another cause is a software issue impacting the channel estimation in the base station. When a specific uplink antenna branch is impaired, the channel information for the antennas of that specific uplink antenna branch is not known.

Antenna Calibration (AC) can be used in systems having multiple antennas to compensate antenna branch impairments relating to phase, time and amplitude. One typical antenna calibration process involves sending and receiving calibration signals through the antenna branches and antennas. The phase, time and amplitude of each antenna branch can be detected, measured, and compensated. However, when antenna calibration fails, the principle of reciprocity cannot be used.

One current way to handle impaired antenna branches is to report the antenna calibration failure or antenna branch hardware failure.

Another current way to handle impaired antenna branches is to disable the impaired antenna branch. However, the impairment might only be temporary. If the impaired antenna branch is disabled, there is no possibility to recover the thus disabled antenna branch even if the temporary impairment would be resolved. Another drawback is that the Equivalent Isotropically Radiated Power (EIRP) of the base station would be impacted when the antenna branch is disabled.

Another current way to handle impaired antenna branches is to use a default value for the channel information of any impaired antenna branch. This could degrade the correctness of the channel estimation.

Hence, there is still a need for improved mechanisms for handling of impaired antenna branches.

SUMMARY

An object of embodiments herein is to provide efficient handling of an impaired antenna branch at a radio transceiver device that does not suffer from the issues noted above, or at least where these issues are mitigated or reduced.

According to a first aspect there is presented a method for handling an impaired antenna branch at a radio transceiver device. The radio transceiver device comprises a plurality of antenna branches. Channel information is correlated among the respective antenna branches according to a correlation relation. The method is performed by a network node. The method comprises obtaining an indication that at least one of the antenna branches at the radio transceiver device is impaired. The method comprises, in response thereto obtaining channel information for each of the non-impaired antenna branches at the radio transceiver device. The method comprises estimating channel information for each of the at least one impaired antenna branch using the obtained channel information and the correlation relation.

According to a second aspect there is presented a network node for handling an impaired antenna branch at a radio transceiver device. The radio transceiver device comprises a plurality of antenna branches. Channel information is correlated among the respective antenna branches according to a correlation relation. The network node comprises processing circuitry. The processing circuitry is configured to cause the network node to obtain an indication that at least one of the antenna branches at the radio transceiver device is impaired. The processing circuitry is configured to cause the network node to, in response thereto, obtain channel information for each of the non-impaired antenna branches at the radio transceiver device. The processing circuitry is configured to cause the network node to estimate channel information for each of the at least one impaired antenna branch using the obtained channel information and the correlation relation.

According to a third aspect there is presented a computer program for handling an impaired antenna branch at a radio transceiver device, the computer program comprising computer program code which, when run on a network node, causes the network node to perform a method according to the first aspect.

According to a fourth aspect there is presented a computer program product comprising a computer program according to the third aspect and a computer readable storage medium on which the computer program is stored. The computer readable storage medium could be a non-transitory computer readable storage medium.

Advantageously this method, this network node, this computer program, and this computer program product provide efficient handling of an impaired antenna branch at the radio transceiver device.

Advantageously this method, this network node, this computer program, and this computer program product do not suffer from the issues noted above.

Advantageously this method, this network node, this computer program, and this computer program product can be used to improve reciprocity based downlink beamforming performance in the case of faulty uplink antenna branches.

Advantageously this method, this network node, this computer program, and this computer program product can be used for automatic healing of the radio transceiver device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
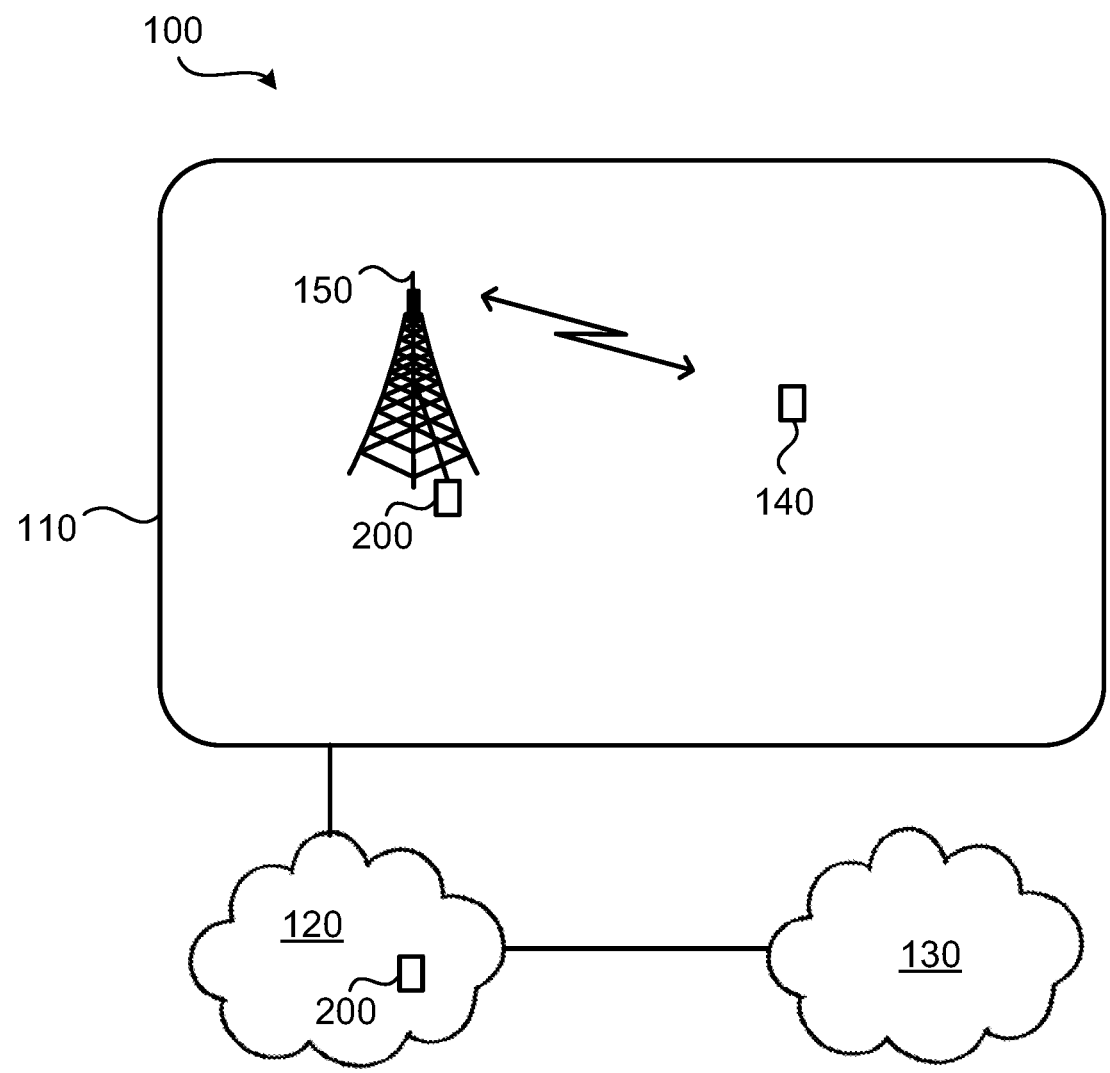
FIG. 1 is a schematic diagram illustrating a communications network according to embodiments.

FIG. 1 is a schematic diagram illustrating a communications network 100 where embodiments presented herein can be applied. The communications network 100a could be a third generation (3G) telecommunications network, a fourth generation (4G) telecommunications network, or a fifth (5G) telecommunications network and support any 3GPP telecommunications standard, where applicable. The communications network 100 comprises a radio transceiver device 150 configured to provide network access over one or more radio propagation channels to other radio transceiver devices, such as terminal device 140 in a radio access network 110. In some embodiments the radio transceiver device 150 is part of, integrated with, or collocated with, a radio access network node, radio base station, base transceiver station, node B, evolved node B, gNB, access point, or the like. The radio access network 110 is operatively connected to a core network 120. The core network 120 is in turn operatively connected to a packet data network 130, such as the Internet. The terminal device 140 is thereby, via the radio transceiver device 150, enabled to access services of, and exchange data with, the service network 130.

As disclosed above, there is a need for improved mechanisms for handling of impaired antenna branches.

The embodiments disclosed herein therefore relate to mechanisms for handling an impaired antenna branch at the radio transceiver device 150. In order to obtain such mechanisms there is provided a network node 200, a method performed by the network node 200, a computer program product comprising code, for example in the form of a computer program, that when run on a network node 200, causes the network node 200 to perform the method. The network node 200 might be provided in the radio transceiver device 150, be collocated with the radio transceiver device 150, be provided elsewhere in the radio access network 110 or in the core network 120. Further, the functionality of the network node 200 might be split between at least two physically separated devices located at different places in the communications network 100.

Figure 2:
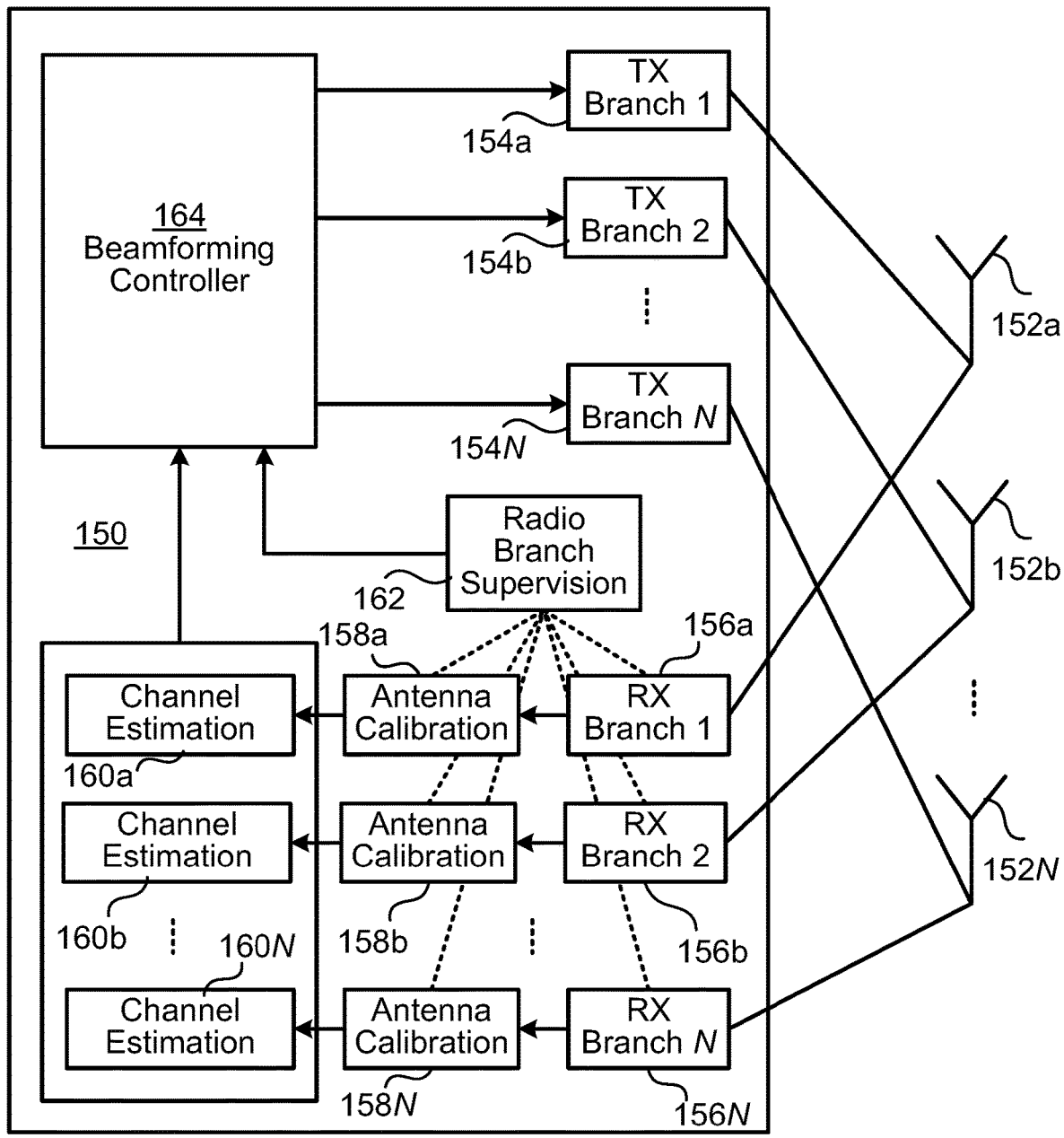
FIG. 2 schematically illustrates a radio architecture of a radio transceiver device according to an embodiment.

FIG. 2 illustrates a simplified radio architecture of radio transceiver device 150. The radio transceiver device 150 comprises N antennas 152a, 152b, . . . 152N, each of which having its own transmission (TX) downlink antenna branch 154a, 154b, . . . 154N and reception (RX) uplink antenna branch 156a, 156b, . . . 156N. The radio transceiver device 150 might thus have a plurality of antenna branches. Each uplink antenna branch is calibrated by an antenna calibration unit 158a, 158b, . . . 158N. Channel information is by channel estimation units 160a, 160b, . . . 160N estimated in each uplink antenna branch from uplink reference signals as received in the uplink antenna branches. Table 1 is an example of a channel matrix of 32 antenna branches (i.e., where N=32). The skilled person would understand that the herein disclosed embodiments are also applicable for different number of antenna branches.

TABLE 1

Example of channel information matrix for 32 antenna branches.

| $h_3$ | $h_7$ | $h_{11}$ | $h_{15}$ | $h_{19}$ | $h_{23}$ | $h_{27}$ | $h_{31}$ |
| $h_2$ | $h_6$ | $h_{10}$ | $h_{14}$ | $h_{18}$ | $h_{22}$ | $h_{26}$ | $h_{30}$ |
| $h_1$ | $h_5$ | $h_9$ | $h_{13}$ | $h_{17}$ | $h_{21}$ | $h_{25}$ | $h_{29}$ |
| $h_0$ | $h_4$ | $h_8$ | $h_{12}$ | $h_{16}$ | $h_{20}$ | $h_{24}$ | $h_{28}$ |

The channel information is passed to a beamforming controller 164 that is configured to determine beamforming coefficients, or weights, to be applied at the downlink antenna branches in order for different transmission beams to be generated. In this respect the beamforming controller 164 might combine all pieces of the channel information when determining the beamforming coefficients for the downlink beamforming.

When there is an antenna calibration failure or other impairment (such as hardware or software failure) of uplink antenna branch k, the channel information $h_k$ of the impaired uplink antenna branch might not be accurate. A radio branch supervision unit 162 is therefore configured to detect impairments of any uplink antenna branch and send this information to beamforming controller 164. Assuming for non-limiting and illustrating purposes that antenna branch k=10 is impaired and thus that $h_{10}$ represents inaccurate channel information, $h_{10}$ shall therefore not be used by the beamforming controller 164 when determining beamforming coefficients. According to the embodiments disclosed herein, an estimate $h^*_{10}$ of $h_{10}$ is obtained from the remaining pieces of channel information $h_0, h_1, \ldots, h_i, \ldots, h_N$ (i≠10).

The channel information for some pairs (or tuples) of antenna branches might be more correlated than the channel information for other pairs (or tuples) of antenna branches. How this correlation varies among different pairs (or tuples) of the antenna branches is specified by a correlation relation. The channel information is thus assumed to be correlated among the respective antenna branches according to a correlation relation. In general terms the channel information for antenna branches located physically close to each other might have a higher correlation than the channel information for antenna branches located physically far from each. However, the correlation relation is dependent on the physical radio propagation environment in which the radio transceiver device 150 operates and for example depends on line of sight conditions and thus for some physical radio propagation environments the channel information for antenna branches located physically far from each other might have a higher correlation than the channel information for antenna branches located physically close to each other.

Figure 3:
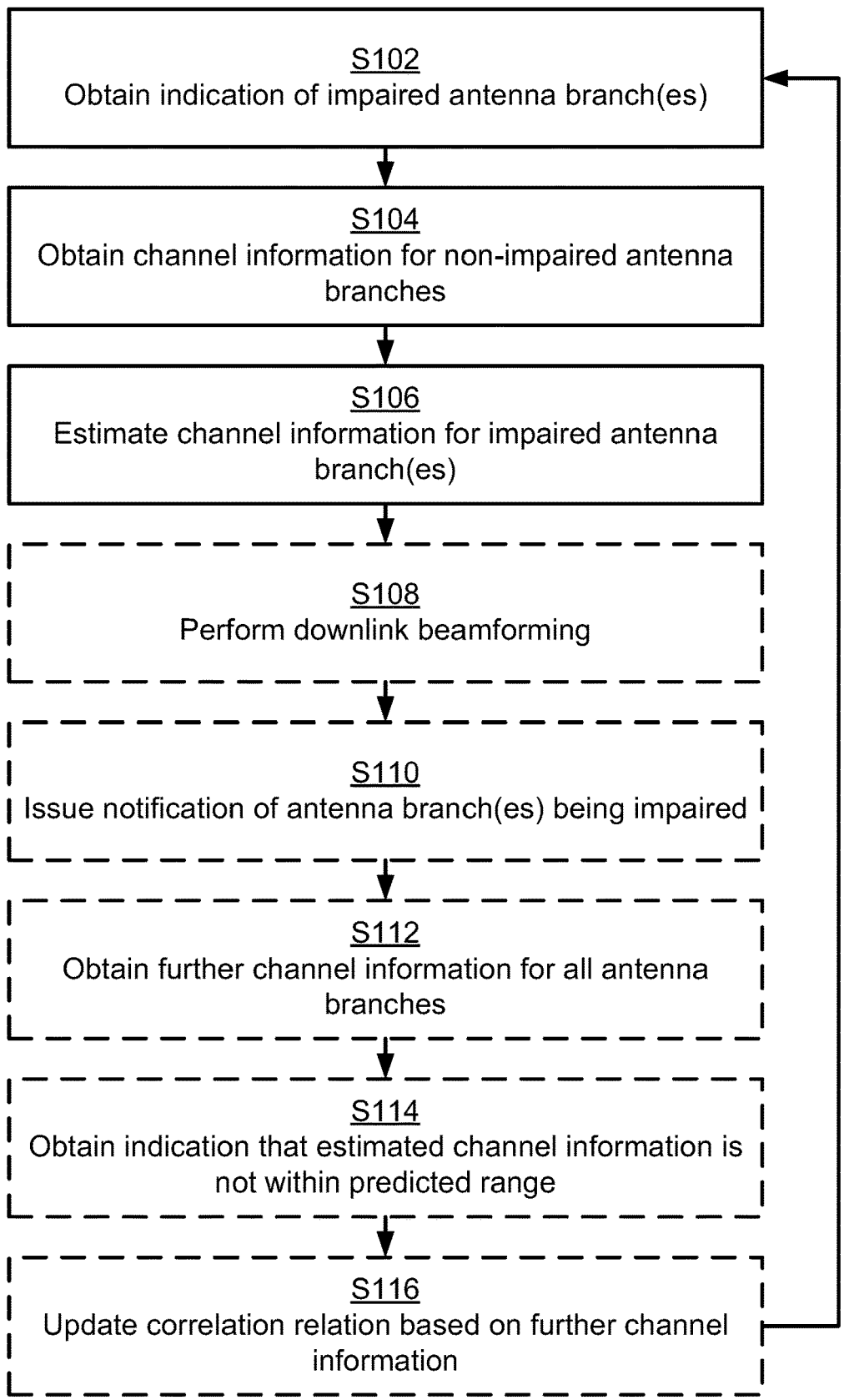
FIGS. 3, 6, and 7 are flowcharts of methods according to embodiments.

FIG. 3 is a flowchart illustrating embodiments of methods for handling an impaired antenna branch at a radio transceiver device 150. The methods are performed by the network node 200. The methods are advantageously provided as computer programs 1220.

It is assumed that at least one of the antenna branches at the radio transceiver device is impaired and that the network node 200 is made aware of this. The network node 200 is thus configured to perform action S102:

S102: The network node 200 obtains an indication that at least one of the antenna branches at the radio transceiver device is impaired.

Channel information for the at least one of the antenna branches that is impaired is then estimated using the channel information for each of the non-impaired antenna branches and the correlation relation. The network node 200 is therefore configured to perform actions S104 and S106 in response thereto (i.e., in response to having obtained the indication in action S102):

S104: The network node 200 obtains channel information for each of the non-impaired antenna branches at the radio transceiver device.

S106: The network node 200 estimates channel information for each of the at least one impaired antenna branch using the obtained channel information and the correlation relation.

Embodiments relating to further details of handling an impaired antenna branch at a radio transceiver device 150 as performed by the network node 200 will now be disclosed.

There could be different ways for the network node 200 to obtain the channel information. According to an embodiment, the obtained channel information for each of the non-impaired antenna branches is based on measurements on uplink reference signals. Hence, the terminal device 140 might transmit uplink reference signals that the radio transceiver device 150 receives and measures on, and where the network node 200 obtains the measurements on the uplink reference signals from the radio transceiver device 150. The uplink reference signals could be sounding reference signals (SRSs). There could be different types of channel information. In one non-limiting example the channel information is channel state information (CSI).

If too many of the antenna branches at the radio transceiver device are impaired, then it could be that there is not enough channel information obtained for the non-impaired antenna branches at the radio transceiver device. It could be that the channel information for each of the at least one impaired antenna branch therefore is not correctly estimated if too many of the antenna branches at the radio transceiver device are impaired. In some aspects the indication therefore specifies that less than a threshold number of the antenna branches at the radio transceiver device are impaired. This might prevent the method from being performed when too many of the antenna branches at the radio transceiver device are impaired.

There may be different ways in which the antenna branches could be impaired. According to some non-limiting examples the at least one impaired antenna branch suffers from a hardware failure, firmware failure, software failure, or failed antenna calibration. The hardware failure might be a radio hardware failure, e.g. a faulty low noise amplifier (LNA), filter, circuit, cable, switch, etc.

There may be different ways for the network node 200 to act once the channel information has been obtained for all the antenna branches, as accomplished by actions S104 and S106.

In this respect, the expression all the antenna branches is generally to be interpreted as all antenna branches which are active, since there might be some antenna branch, or branches, for which impairments cannot be compensated. Such antenna branches might be disconnected and hence no longer be active.

In some aspects the channel information is used during downlink beamforming. Hence, according to an embodiment the network node 200 is configured to perform (optional) action S108: S108: The network node 200 performs downlink beamforming based on the obtained channel information and the estimated channel information.

Further, in some aspects a notification is issued once the network node 200 has obtained the indication in action S102 that the at least one of the antenna branches at the radio transceiver device 150 is impaired. Hence, according to an embodiment the network node 200 is configured to perform (optional) action S110:

S110: The network node 200 issues a notification that the at least one of the antenna branches at the radio transceiver device is impaired.

The network node 200 could thereby provide a status update to a user of the radio transceiver device 150. One example of a status update would be to inform the user that an impairment of at least one of the antenna branches has been detected, and that the impairment has been handled in order to sustain the operation of the radio transceiver device 150. In relation thereto, any alarm of an impaired antenna branch could be downgraded (e.g., from "critical" to "major" or "minor") as a result of the channel information for each of the at least one impaired antenna branch having been obtained in action S106 using the obtained channel information and the correlation relation.

There may be different types of correlation relations and different ways to establish, or obtain, the correlation relation. Different embodiments relating thereto will now be described in turn. In some aspects the correlation relation is learned from training.

In some aspects the correlation relation varies depending on the physical radio propagation environment the radio transceiver device 150 is operating in. The physical radio propagation environment might be represented by a channel model. For example, the correlation might be linear in a channel model assuming line of sight (LOS) between the radio transceiver device 150 and the terminal device 140 but it might be non-linear in a channel model not assuming LOS (non-LOS). According to a first embodiment, the correlation relation is learned from training performed on the channel information for all the antenna branches when none of the antenna branches are impaired. This ensures that the correlation relation is learned when all antenna branches are functioning properly. According to a second embodiment, the correlation relation is learned from training performed on the channel information for all the antenna branches from before obtaining the indication in action S102 that the at least one of the antenna branches is impaired. The correlation relation can thereby be learned even if the physical radio propagation environment has changed since impairment of the at least one of the antenna branches was been detected.

In some aspects more channel information is obtained. In particular, according to an embodiment the network node 200 is configured to perform (optional) action S112:

S112: The network node 200 obtains further channel information for all the antenna branches at the radio transceiver device.

As above, the further channel information might in some examples only be obtained when none of the antenna branches are impaired and in other examples be obtained for all the antenna branches even if at least one of the antenna branches has been detected as impaired.

In some aspects the further channel information is used for training a model in order to obtain a refined correlation relation. That is, according to an embodiment the network node 200 is configured to perform (optional) action S116:

S116: The network node 200 updates the correlation relation by training a model with the further channel information as input.

In some aspects the model is only trained when the channel information for each of the at least one impaired antenna branch (as estimated is action S106) is not within a predicted range. In particular, according to an embodiment the network node 200 is configured to perform (optional) action S114:

S114: The network node 200 obtains a further indication that the estimated channel information for each of the at least one impaired antenna branch is not within a predicted range. The correlation relation is then only updated in response thereto. That is, action S116 is then only performed when the estimated channel information for each of the at least one impaired antenna branch is not within the predicted range.

Further aspects of how the model might be trained will now be disclosed. In some examples each of the antenna branches is associated with its own weight in the model, and the weights are updated when the model is trained.

In some examples, each of the antenna branches at the radio transceiver device 150 is associated with its own position relative all other antenna branches, and the positions of all antenna branches are used as input to the model. In some embodiments machine learning is used to train the model. Machine learning might thus be used to learn the correlation relation. In some examples the model is provided as a neural network.

Further aspects of using machine learning to learn the correlation relation will now be disclosed. Assume that $h^*_k$ represents the channel information of impaired antenna branch k and that N is the number of total antenna branches at the radio transceiver device 150. Further, let $f_{NET\_W}$ be the function that in the machine learning model represents the correlation relation. Also, let the machine learning model be configured with a parameter set W that is to be learned from data, let $P_k$ be the index, or position, of the impaired antenna branch, and let $h_i$, $i \neq k$, $i \leq N$ be the channel information for any non-impaired antenna branch. Then, $h^*_k$ can be determined as follows:

$$h^*_k = f_{NET\_W}(P_k, h_1, h_2, \ldots, h_i), i \neq k, i \leq N$$

The method can be extended to estimate the channel information for more than one impaired antenna branch as follows:

$$h^*_{k1} = f_{NET\_W}(P_{k1}, h_1, h_2, \ldots, h_i), i \neq k1, k2, \ldots, kp; i \leq N$$

$$h^*_{k2} = f_{NET\_W}(P_{k2}, h_1, h_2, \ldots, h_i), i \neq k1, k2, \ldots, kp; i \leq N$$

$$\ldots$$

$$h^*_{kp} = f_{NET\_W}(P_{kp}, h_1, h_2, \ldots, h_i), i \neq k1, k2, \ldots, kp; i \leq N$$

It is here noted that k k1, k2, . . . , kp might not be continuous. It is further noted that the index, for example i, k, kp, contains information of the position of the corresponding antenna element. The channel information as used by the machine learning might be tagged with the position information in order to improve its performance.

Figure 4:
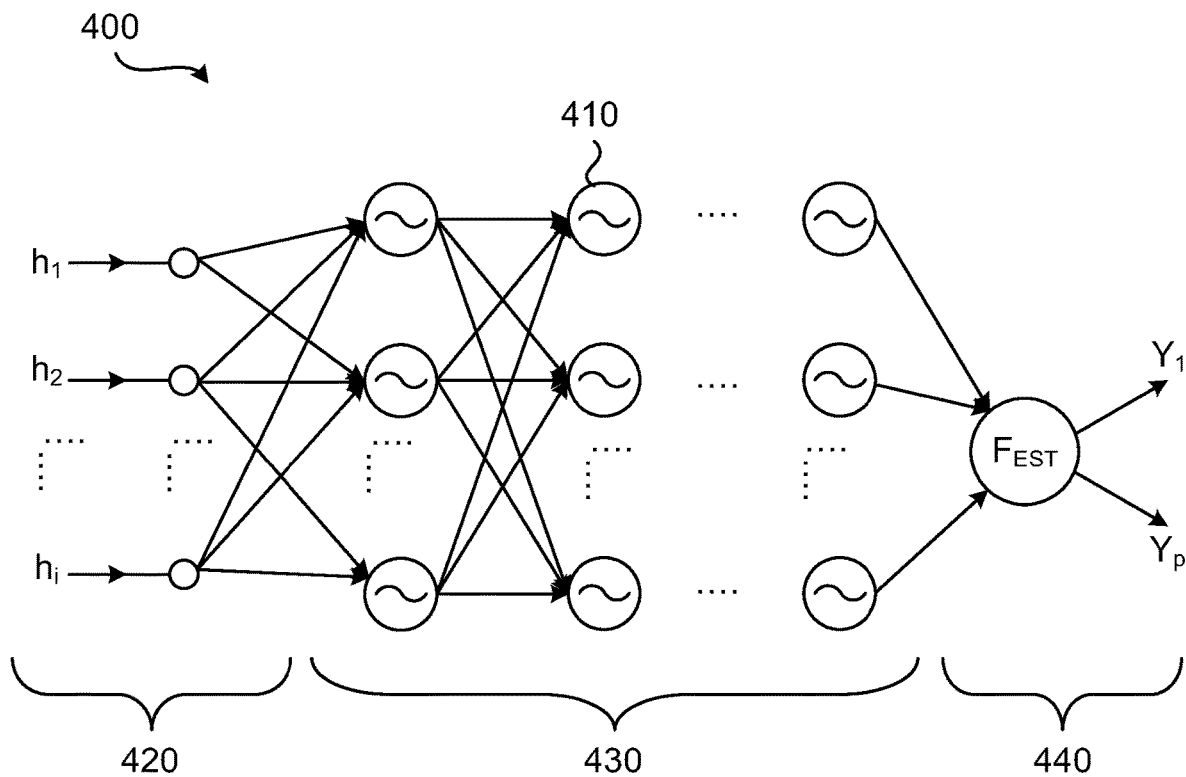
FIG. 4 is a schematic diagram of a neural network of a machine learning model according to an embodiment.

In some aspects, supervised learning is used to find the correlation relation by learning from a large number of channel information matrices (as the one in Table 1). FIG. 4 schematically illustrates a multi-layer neural network model 400 used as the machine learning model. The multi-layer neural network model 400 comprises units 410 at an input layer 420, at one or more hidden layers 430, and at an output layer 440.

The input layer 420 is represented by the channel information $h_1, h_2, \ldots, h_i$ from all non-impaired antenna branches. In order to obtained balanced input data to the model for improved training, the channel information might be pre-processed before being input to the hidden layers. According to an example Mean-Cancellation is used to normalize the channel information as follows:

$$z_i = \frac{h_i - \text{mean}(h)}{\text{max}(h) - \text{mean}(h)}$$

Here, mean(h) is the mean value of all $h_1, h_2, \ldots, h_i$ and max(h) is the maximum value of all $h_1, h_2, \ldots, h_i$.

Figure 5:
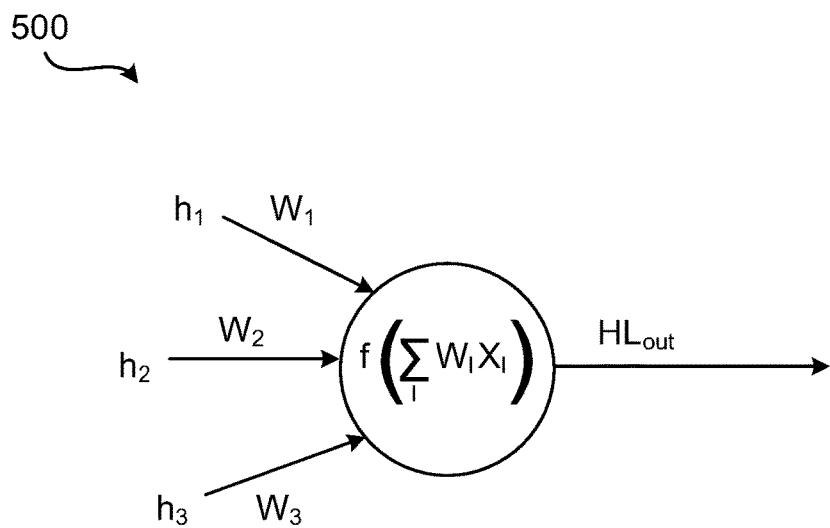
FIG. 5 is a schematic diagram of a hidden node in the neural network of FIG. 4 according to an embodiment.

The hidden layers 430 contain hidden units. Each hidden unit is a non-linear activation function (for example a rectified linear unit (ReLU) activate function, a hyperbolic tangent (tan h) function, etc.). The inputs to the hidden units are the outputs of the previous layer. FIG. 5 schematically illustrates one hidden unit 500 being at the first hidden layer (i.e., the left-most hidden layer in FIG. 4). As an example, the ReLU function can be used to capture any non-linearity of the correlation relation and mitigate the vanishing gradient problem. The ReLU function can be written as f(x)=max (0, x) for any input x.

The estimated values $h^*_{k1}, h^*_{k2}, \ldots, h^*_{kp}$ of the channel information for the impaired antenna branches define the output layer 440. In FIG. 4, $F_{EST}$ is the output layer function according to which $h^*_{k1}, h^*_{k2}, \ldots, h^*_{kp}$ are determined.

Considering the output data type and value distributions among the value ranges, the units of the output layer might use the tan h function:

$$\tanh(x) = \frac{e^x - e^{-x}}{e^x + e^{-x}}$$

to arrive at the estimated values $h^*_{k1}, h^*_{k2}, \ldots, h^*_{kp}$. The inverse operations of the Mean-Cancellation are then applied in order to de-normalize the estimated values $h^*_{k1}, h^*_{k2}, \ldots, h^*_{kp}$.

In some aspects the machine learning is based on finding a parameter set W that minimizes a loss function. In some aspects the loss function is determined by the Mean Squared Error (MSE) as determined from observed samples $y_{obs,j}$ and estimated $y_{est,j}$ samples, and where J is the number of total samples used when determining the loss function:

$$MSE = \frac{1}{J}\sum_{j=1}^{J}(y_{obs,j} - y_{esc,j})^2$$

In some aspects the adaptive moment estimation (Adam) optimization algorithm is used in order to find the parameter set W. The Adam optimization algorithm is an extension to stochastic gradient descent (SGD).

The Adam optimization algorithm has the benefit of being appropriate for problems with noisy and non-stationary objectives, which might be the case for the channel information that is to be estimated.

In some aspects the $R^2$ score is used to evaluate the performance of the machine learning model. If $\hat{y}_i$ is the estimated value of the i i:th sample and $y_i$ is the corresponding true value and y is the mean value of all $y_i$ then the $R^2$ score estimated over $n_{samples}$ is defined as:

$$R^2(y, \hat{y}) = 1 - \left(\sum_{i=0}^{n_{samples}-1}(y_i - \hat{y}_i)^2\right) \bigg/ \left(\sum_{i=0}^{n_{samples}-1}(y_i - \bar{y})^2\right)$$

In general terms, the $R^2$ score provides a measure of how well future samples are likely to be predicted by the model. The best possible value of $R^2(y,\hat{y})$ is 1.0 and the value of $R^2(y,\hat{y})$ can be negative since the model can become arbitrarily worse.

The skilled person would understand that this is just an example, and thus that the number of layers, units, inputs, outputs might be different. Thus, more functions or layers may be added as needed.

Figure 6:
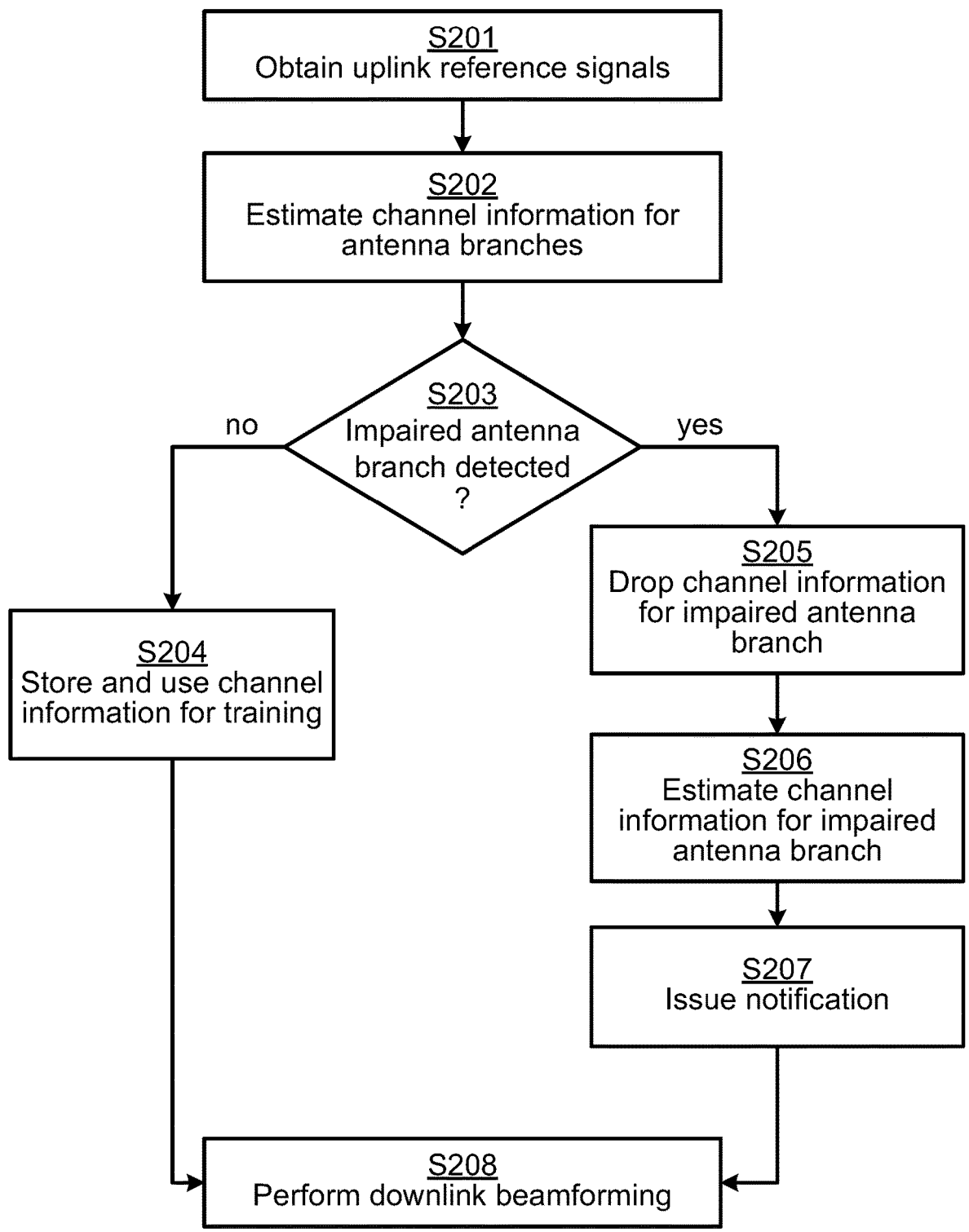

A first particular embodiment for handling an impaired antenna branch at a radio transceiver device 150 as based on at least some of the above disclosed embodiments will now be disclosed with reference to the flowchart of FIG. 6.

S201: The radio transceiver device 150 receives uplink reference signals from one or more terminal devices 140.

S202: The radio transceiver device 150 estimates the channel information based on the measurements on the uplink reference signals.

S203: The radio transceiver device 150 checks if any of the antenna branches are impaired. Action S204 is entered when none of the antenna branches are detected to be impaired. Action S205 is entered when at least one antenna branch is detected to be impaired.

S204: The channel information for all antenna branches is stored and used for training the machine learning model and thus to improve the accuracy of the correlation relation.

S205: The channel information for all the antenna branches detected to be impaired is dropped.

S206: The network node 200 estimates the channel information for each of the at least one impaired antenna branch using machine learning with the obtained channel information for the non-impaired antenna branches as input.

S207: The network node 200 issues a notification that the at least one of the antenna branches at the radio transceiver device 150 is impaired.

S208: The radio transceiver device 150 performs downlink beamforming based on the channel information.

Figure 7:
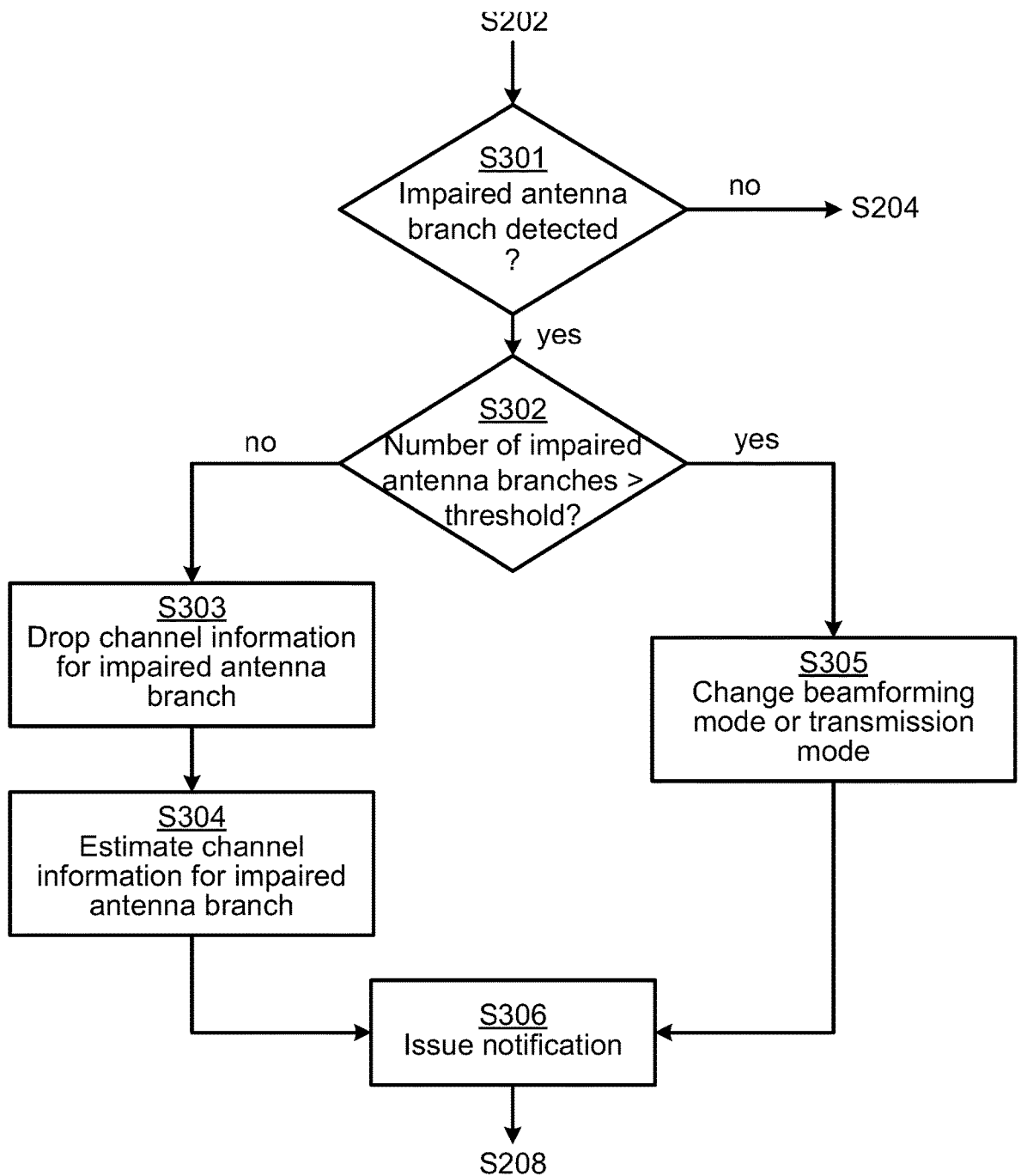

A second particular embodiment for handling an impaired antenna branch at a radio transceiver device 150 as based on at least some of the above disclosed embodiments will now be disclosed with reference to the flowchart of FIG. 7.

It is assumed that actions S201 and S202 are performed as in FIG. 6.

S301: The radio transceiver device 150 checks if any of the antenna branches are impaired. Action S204 as in FIG. 6 is entered when none of the antenna branches are detected to be impaired. Action S302 is entered when at least one antenna branch is detected to be impaired.

S302: The radio transceiver device 150 checks the number of impaired antenna branches. Action S303 is entered when the number of impaired antenna branches is not larger than the threshold value. Action S305 is entered when the number of impaired antenna branches is larger than the threshold value.

S303: The channel information for all the antenna branches detected to be impaired is dropped.

S304: The network node 200 estimates the channel information for each of the at least one impaired antenna branch using machine learning with the obtained channel information for the non-impaired antenna branches as input.

S305: The radio transceiver device 150 changes beamforming mode or transmission mode. The beamforming mode or transmission mode could be changed to other modes in terms of transmission diversity, only using one single fixed beam, or fixed beams in a group of beams (GOB), etc.

S306: The network node 200 issues a notification that the at least one of the antenna branches at the radio transceiver device 150 is impaired. When action S305 has been performed the notification might further specify that beamforming mode or transmission mode has been changed.

Action S208 as in FIG. 6 is then entered. However, when action S305 has been performed the beamforming in action S208 is adapted according to action S305.

Figure 8:
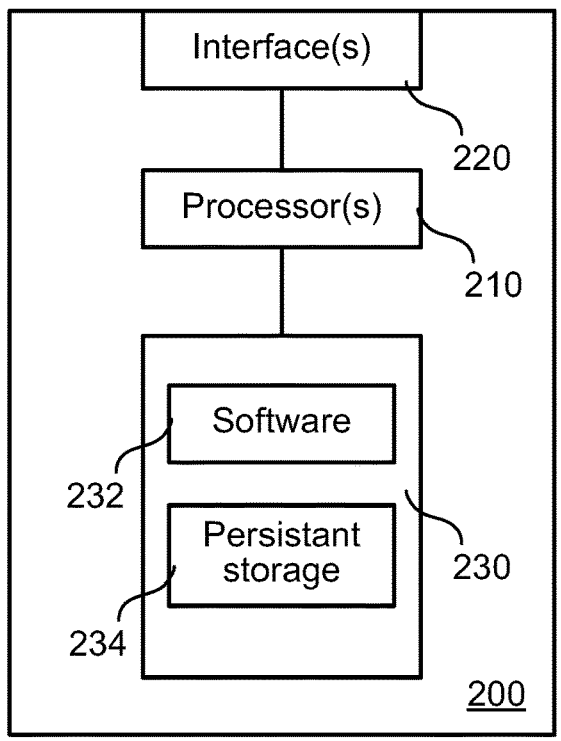
FIG. 8 is a schematic diagram showing functional units of a network node according to an embodiment.

FIG. 8 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210 (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of actions, operations, or steps, as disclosed above. For example, the storage medium 230 may store software 232 defining a set of operations for performing the set of actions, operations, or steps, and the processing circuitry 210 may be configured to retrieve the set of operations from the storage medium 230 to cause the network node 200 to perform the set of operations. The set of operations may be provided as a set of executable instructions. Thus, the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, node, functions, units, and devices. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 9:
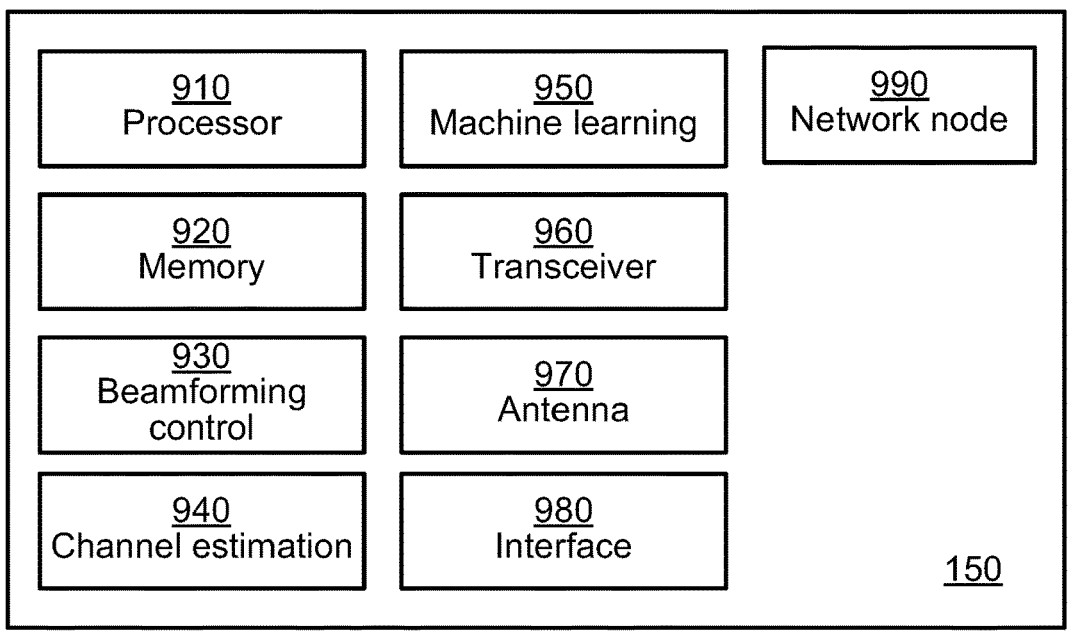
FIGS. 9, 10, and 11 are schematic diagrams showing functional modules of a radio transceiver device according to embodiments.

FIG. 9 schematically illustrates, in terms of a number of functional modules, the components of a radio transceiver device 150 according to a first embodiment.

The radio transceiver device 150 comprises a processor module 910, a memory module 920, a beamforming control module 930, a channel estimation module 940, a machine learning module 950, a transceiver module 960, an antenna module 970, an interface module 980 and a network node module 990. These modules may be operatively connected with each other or otherwise configured to communicate with each other either directly or indirectly.

The processor module 910 might implement the functionality of any type of processing circuitry, such as a CPU, DSP, ASIC, or FPGA etc. and be configured to process signals and perform computation as called for by algorithms.

The memory module 920 might implement the functionality of any type of memory, such as DDR, RAM etc. and be configured to store the channel information, data samples, model parameters, beamforming coefficients, etc.

The beamforming control module 930 might be implemented to perform the functionality of the beamforming controller 164 and be configured to determine beamforming coefficients.

The channel estimation module 940 might be implemented to perform the functionality of the channel estimation units 160a, 160b, . . . 160N and thus to estimate the channel information for the uplink antenna branches 156a, 156b, . . . 156N. The channel estimation module 940 might further be configured to provide the channel information to the machine learning module 950.

The machine learning module 950 might implement the functionality of the machine learning model and be configured to utilize the channel information and other information for estimating channel information for impaired antenna branches and for continuous training or learning to improve the accuracy of the estimation.

The transceiver module 960 might implement the functionality of a modem and thus of the downlink antenna branches 154a, 154b, . . . 154N and the uplink antenna branches 156a, 156b, . . . 156N.

The antenna module 970 might implement the functionality of an antenna array comprising antennas 152a, 152b, . . . 152N.

The interface module 980 might implement the functionality of a communication interface and a user interface. The interface module 980 might be configured to operatively connect the radio transceiver device 150 to Ethernet or another node. The interface module 980 might be configured to implement the functionality of a user interface in order to enable a user, or human operator, to communicate with the radio transceiver device 150.

The network node module 990 might implement the functionality of the network node 200. In some aspects the machine learning module 950 is implemented as part of the network node module 990.

Figure 10:
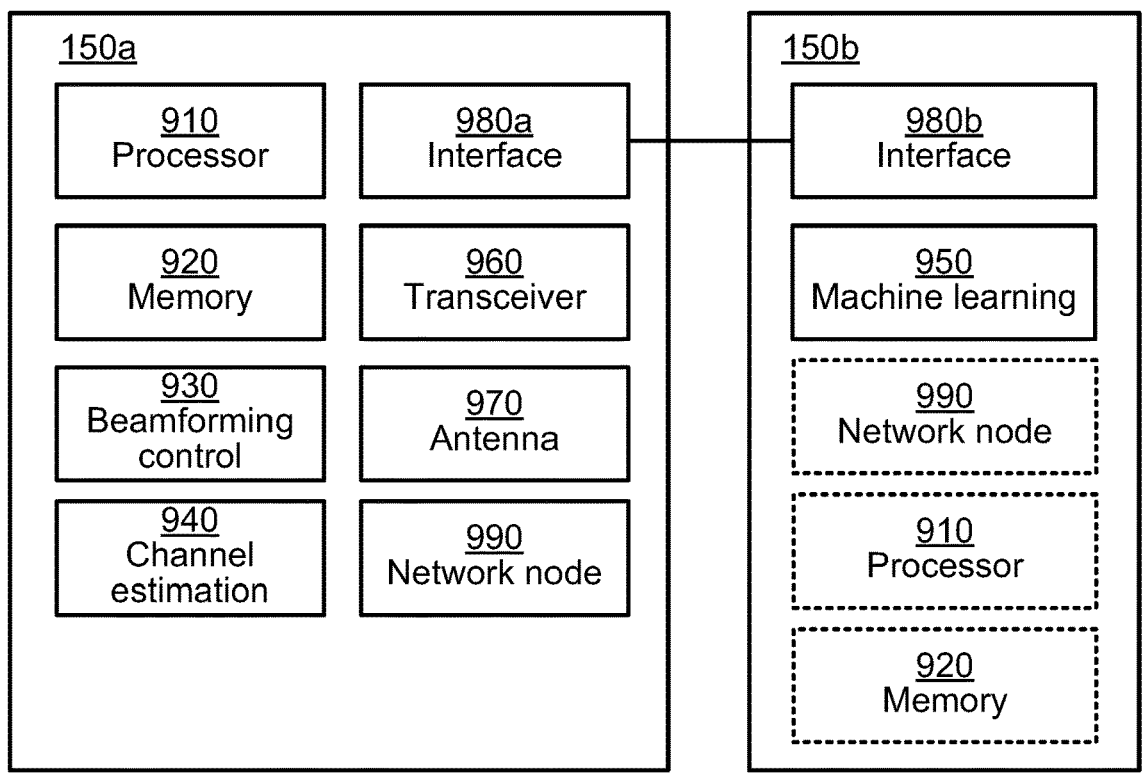

FIG. 10 schematically illustrates, in terms of a number of functional modules, the components of a radio transceiver device according to a second embodiment. As for the radio transceiver device 150 in FIG. 10, the radio transceiver device in FIG. 11 comprises a processor module 910, a memory module 920, a beamforming control module 930, a channel estimation module 940, a machine learning module 950, a transceiver module 960, and an antenna module 970 which all have the same functionalities as in FIG. 10.

Figure 11:
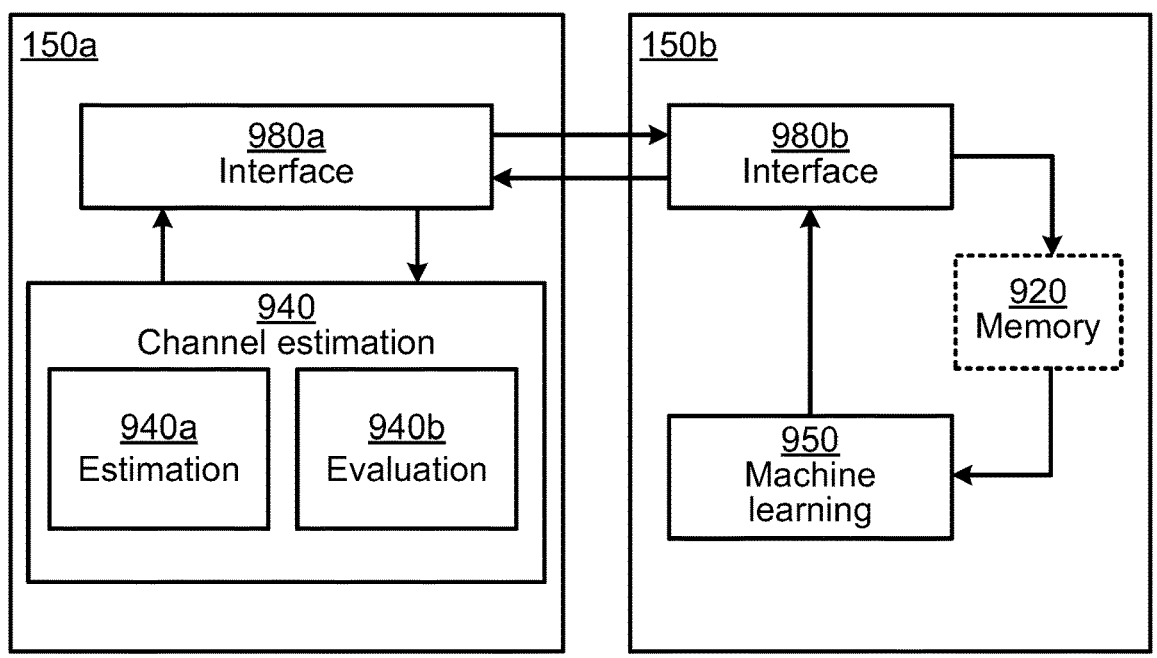

In the embodiment of FIG. 11 the functionality of the radio transceiver device has been split into two parts 150a, 150b and thus the functionality of the interface module 980 of FIG. 10 has been split into interface modules 980a, 980b and extended in order to enable communication between the radio transceiver device parts 150a, 150b. The machine learning module 950 is provided in the second radio transceiver device part 150b whereas the remaining modules are provided in the first radio transceiver device part 150a. The network node module 990 might be provided either in the first radio transceiver device part 150a or in the second radio transceiver device part 150b. The processor module 910 and the memory module 920 might be provided both the first radio transceiver device part 150a and the second radio transceiver device part 150b in order to provide computational support and memory support for the other modules in the first radio transceiver device part 150a and in the second radio transceiver device part 150b. The second radio transceiver device part 150b might be implemented in an external server or node that might be located in a cloud computational environment.

FIG. 11 schematically illustrates, in terms of a number of functional modules, the training or learning process of the machine learning model as disclosed above using some of the modules of FIGS. 9 and 10 and the embodiment of FIG. 10 where the machine learning module 950 is provided in the second radio transceiver device part 150b and the modules not explicitly involved in the training or learning process have been omitted although at least the processor module 910 might be involved implicitly for performing operations.

In the example of FIG. 11 the channel estimation module 940 comprises an estimation module 940a configured to estimate the channel information and an evaluation module 940b configured to evaluate the performance of the estimation module 940a. For illustrative purposes it is assumed that the evaluation module 940b determines that the estimated channel information for each of the at least one impaired antenna branch is not within a predicted range. A signal is therefore generated by the evaluation module 940b and sent by the channel estimation module 940 towards the interface module 980a to trigger machine learning. The interface module 980a forwards the signal to the interface module 980b. The latest stored channel information is fetched from the memory module 920 and input to the machine learning module 950. The machine learning module 950 performs training or learning using the latest stored channel information. The machine learning module 950 outputs updated parameters, defining a refined correlation relation, and provides the parameters towards the interface module 980b such that the a refined correlation relation can be used by the channel estimation module 940a. The interface module 980b forwards the parameters to the interface module 980a. The interface module 980a provides the parameters to the channel estimation module 940 such that the channel estimation module 940a can be updated. The channel estimation module 940a is updated and thus performs channel estimation using the refined correlation relation. In the example of FIG. 11 the training or learning is triggered by input from the evaluation module 940b. However, the training or learning might be performed on regular intervals, or based on other events or inputs, even if not triggered by input from the evaluation module 940b.

In general terms, each functional module 910-990 may in one embodiment be implemented only in hardware and in another embodiment with the help of software, i.e., the latter embodiment having computer program instructions stored on the storage medium 230 which when run on the processing circuitry 210 makes the network node 200 to perform the corresponding actions mentioned above in conjunction with FIG. 8. It should also be mentioned that even though the modules 910-990 correspond to parts of a computer program, they do not need to be separate modules therein, but the way in which they are implemented in software is dependent on the programming language used. Preferably, one or more or all functional modules 910-990 may be implemented by the processing circuitry 210, possibly in cooperation with the communications interface 220 and/or the storage medium 230. The processing circuitry 210 may thus be configured to from the storage medium 230 fetch instructions as provided by a functional module 910-990 and to execute these instructions, thereby performing any steps as disclosed herein.

The network node 200 may be provided as a standalone device or as a part of at least one further device. A first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 8 the processing circuitry 210 may be distributed among a plurality of devices, or nodes. The same applies to the functional modules 910-990 and the computer program 1220 of FIG. 12.

Figure 12:
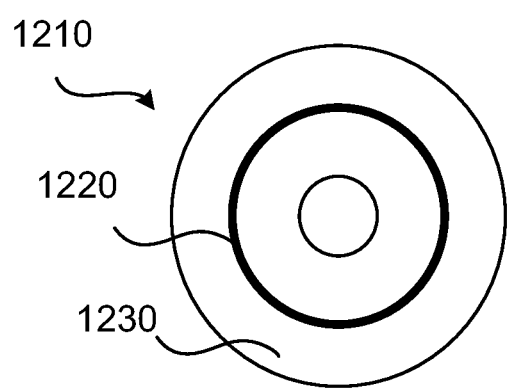
FIG. 12 shows one example of a computer program product comprising computer readable storage medium according to an embodiment.

FIG. 12 shows one example of a computer program product 1210 comprising computer readable storage medium 1230. On this computer readable storage medium 1230, a computer program 1220 can be stored, which computer program 1220 can cause the processing circuitry 210 and thereto operatively coupled entities and devices, such as the communications interface 220 and the storage medium 230, to execute methods according to embodiments described herein. The computer program 1220 and/or computer program product 1210 may thus provide means for performing any steps as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling an impaired antenna branch at a radio transceiver device comprising a plurality of antenna branches, channel information being correlated among the respective antenna branches according to a correlation relation, the method being performed by a network node, the method comprising:
  obtaining an indication that at least one of the antenna branches at the radio transceiver device is impaired, the indication specifying that fewer than a threshold number of the antenna branches at the radio transceiver device is impaired, and in response thereto:
    obtaining channel information for each non-impaired antenna branch of the plurality of antenna branches at the radio transceiver device;

estimating channel information for each of the at least one impaired antenna branch using the obtained channel information and the correlation relation;

obtaining further channel information for all the antenna branches at the radio transceiver device; and updating the correlation relation by training a machine learning model with the further channel information as input.

2. The method according to claim 1, further comprising: performing downlink beamforming based on the obtained channel information and the estimated channel information.

3. The method according to claim 1, wherein the obtained channel information for each of the non-impaired antenna branches is based on measurements on uplink reference signals.

4. The method according to claim 1, wherein the correlation relation is learned from training performed on the channel information for all the antenna branches when none of the antenna branches are impaired.

5. The method according to claim 1, wherein each of the antenna branches is associated with its own weight in the model, and wherein the weights are updated when training the model.

6. The method according to claim 1, wherein the model is provided as a neural network.

7. The method according to claim 1, further comprising: obtaining a further indication that the estimated channel information for each of the at least one impaired antenna branch is not within a predicted range; and wherein the correlation relation only is updated in response thereto.

8. The method according to claim 1, further comprising: issuing a notification that the at least one of the antenna branches at the radio transceiver device is impaired.

9. The method according to claim 1, wherein the channel information is channel state information, CSI.

10. A network node for handling an impaired antenna branch at a radio transceiver device comprising a plurality of antenna branches, channel information being correlated among the respective antenna branches according to a correlation relation, the network node comprising:

processing circuitry and;

a storage medium for storing software instructions for execution by the processing circuitry, the processing circuitry being configured to cause the network node to:

obtain an indication that at least one of the antenna branches at the radio transceiver device is impaired, the indication specifying that fewer than a threshold number of the antenna branches at the radio transceiver device is impaired, and in response thereto:

obtain channel information for each non-impaired antenna branch of the plurality of antenna branches at the radio transceiver device;

estimate channel information for each of the at least one impaired antenna branch using the obtained channel information and the correlation relation;

obtain further channel information for all the antenna branches at the radio transceiver device; and update the correlation relation by training a machine learning model with the further channel information as input.

11. The network node according to claim 10, further configured to:

perform downlink beamforming based on the obtained channel information and the estimated channel information.

12. The network node according to claim 10, further configured to:

issue a notification that the at least one of the antenna branches at the radio transceiver device is impaired.

13. A non-transitory computer storage medium storing a computer program for handling an impaired antenna branch at a radio transceiver device comprising a plurality of antenna branches, channel information being correlated among the respective antenna branches according to a correlation relation, the computer program comprising computer code which, when run on processing circuitry of a network node, causes the network node to:

obtain an indication that at least one of the antenna branches at the radio transceiver device is impaired, the indication specifying that fewer than a threshold number of the antenna branches at the radio transceiver device is impaired, and in response thereto:

obtain channel information for each non-impaired antenna branch of the plurality of antenna branches at the radio transceiver device;

estimate channel information for each of the at least one impaired antenna branch using the obtained channel information and the correlation relation;

obtain further channel information for all the antenna branches at the radio transceiver device; and update the correlation relation by training a machine learning model with the further channel information as input.

* * * * *